United States Patent
Mitamura

(10) Patent No.: US 6,343,917 B1
(45) Date of Patent: Feb. 5, 2002

(54) CENTER MECHANISM OF TIRE PRESS

(75) Inventor: Hisashi Mitamura, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/629,877

(22) Filed: Aug. 1, 2000

(30) Foreign Application Priority Data

Aug. 12, 1999 (JP) ........................................... 11-228334

(51) Int. Cl.$^7$ .............................................. B29C 35/02
(52) U.S. Cl. ........................................ 425/48; 425/52
(58) Field of Search .............................. 425/43, 48, 52, 425/58

(56) References Cited

U.S. PATENT DOCUMENTS

| | | | |
|---|---|---|---|
| 3,910,735 A | * 10/1975 | Caretta | 425/48 |
| 4,395,209 A | * 7/1983 | Singh et al. | 425/58 |
| 4,670,209 A | * 6/1987 | Nakagawa et al. | 425/48 |
| 4,695,234 A | 9/1987 | Amano et al. | |
| 4,846,649 A | * 7/1989 | Hasegawa et al. | 425/58 |
| 4,950,141 A | * 8/1990 | Naikuma et al. | 425/48 |
| 5,106,280 A | * 4/1992 | Sakaguchi | 425/48 |
| 5,409,361 A | 4/1995 | Ichikawa et al. | |
| 5,601,850 A | 2/1997 | Ureshino | |
| 5,776,507 A | 7/1998 | Ureshino et al. | |
| 5,798,123 A | 8/1998 | Mitamura et al. | |

FOREIGN PATENT DOCUMENTS

| | | |
|---|---|---|
| JP | 55-037360 | 3/1980 |
| JP | 59-020643 | 2/1984 |
| JP | 59-192546 | 10/1984 |
| JP | 63-132009 | 6/1988 |

* cited by examiner

Primary Examiner—James P. Mackey
(74) Attorney, Agent, or Firm—Oblon, Spivak, McClelland, Maier & Neustadt, P.C.

(57) ABSTRACT

A center mechanism of a tire press according to the present invention, wherein if the size of a lower mold and the size of a tire are changed, a nut member engaged with external thread of a cylindrical member is rotated and driven whereby a lower clamp portion is moved at a position adjusted to a height of the lower mold to thereby enable changing the lower clamp portion to a height position of a lower metal mold irrespective of the size of the lower metal mold.

10 Claims, 3 Drawing Sheets

CENTER MECHANISM OF TIRE PRESS

BACKGROUND OF THE INVENTION

1. FIELD OF THE INVENTION

The present invention relates to a center mechanism of a tire press for inflating a bladder into close contact with the inner peripheral surface of a green tire.

2. DESCRIPTION OF THE RELATED ART

Generally, before a green tire is molded by a space formed by clamping of an upper mold (upper metal mold) and a lower mold (lower metal mold) of a tire press, shaping for inflating a bladder into close contact with the inner peripheral surface of a green tire is applied by a center mechanism.

As shown in FIG. 3, the conventional center mechanism is arranged in the center of a lower mold 52 on a base frame 51, and a well 54 capable of receiving a bladder 53 therein is moved up and down with respect to the lower mold 52. A lower bead ring 57 supporting a lower bead 56 of a green tire 55 is mounted on the side end of the lower mold 52 of the well 54, and is moved up and down by a vertically movable cylinder 58 provided on the lower side of the base frame 51. The bladder 53 is receivably arranged in the well 54, and the upper and lower ends of the bladder 53 are clamped by an upper clamp portion 59 and a lower clamp portion 60. In the center of the upper clamp portion 59 is supported a center post 61 which passes through the bladder 53 and further extends through the lower clamp portion 60 and the well 54. The center post 61 is moved up and down by an elevating cylinder 62 to expand and contract the bladder 53. The lower clamp portion 60 is supported on the elevating cylinder 62 by a tubular member 63 fitted in the outer periphery of the center post 61, and is moved up and down by an elevating cylinder 64 provided on the lower side of the well 54.

In the center mechanism constructed as described above, the well 54 is moved up to tear off the vulcanized tire 65 from the lower mold 52. However, when a tire having a large compression is vulcanized, an on-allowance of the lower bead 56 relative to the lower bead ring 57 is so lessened that when the tire is torn off from the lower mold 52, the bead is possibly disconnected from the ring. This makes difficult to hold the inner periphery of the vulcanized tire by a delivery loader (unloader), resulting in the inferior removal.

In order to cope with the flat tire as mentioned above, there has been known a center mechanism in which a lower bead ring for supporting a lower bead of a green tire is secured to a lower mold. In the center mechanism of this kind, the vulcanized tire is held by the unloader and torn off from the lower mold, which can fully correspond to the flat tire also.

However, in the type of securing the lower bead ring among the center to the lower mold, when the lower mold is replaced with one different in size, the lower bead ring is to be deviated from the lower clamp portion by a height of the lower mold, thus making it necessary to set the lower clamp portion so as to be parallel with the lower bead ring. By doing so, when a deviation in height occurs, the bladder cannot be inflated into close contact with the inner peripheral surface of the green tire, failing to apply the shaping to the green tire. For this reason, the lower bead ring is moved up and down by the elevating cylinder for adjustment thereof, but the position of the lower clamp ring portion cannot be adjusted with good accuracy depending on the elevating cylinder.

SUMMARY OF THE INVENTION

It is an object of the present invention to provide a center mechanism capable of changing a lower clamp portion to a height position of a lower metal mold (a position parallel with a lower bead ring) irrespective of the size of the lower metal mold.

The present invention provides a center mechanism of a tire press, in which an upper clamp portion and a lower clamp portion freely inserted into the inner surface of a green tire inserted into closing upper and lower metal molds are separately moved up and down, comprising a well for receiving a bladder, a lower bead ring for supporting a lower bead of a green tire being secured to said lower metal mold, said center mechanism comprising: a center post for supporting the upper clamp portion, a hollow member for supporting the lower clamp portion and extending around the center post, a support member provided below the hollow member, a first vertically moving member connected to the lower end of the center post and mounted on the support member, a tubular member positioned downward of the support member and positioned around the first vertically moving means and provided with an external thread portion, an elevating member for rotatably holding an internal thread portion engaged with the external thread portion, and driven and rotated, and a second vertically moving means mounted on a frame connected to the elevating member to support the lower metal mold.

In this case, if the size of the lower metal mold is changed, the internal thread portion engaged with the external thread portion is rotated and driven whereby the lower clamp portion can be moved to the position adjusted to the height of the lower metal mold, making it possible to automatically cope with the change of the height of the lower metal mold. Since the hollow member and so on are arranged around the center post, the whole center mechanism can be received compactly.

Preferably, a disengageable stopper member for stopping the downward movement of the lower clamp portion is provided between said elevating member and said frame.

In this case, it is possible to prevent the lower clamp from being forced down by fluid pressure exerting on the bladder in shaping of the green tire. Therefore, no change occurs in a positional relation between the lower clamp portion and the lower bead ring.

Further, preferably, as the first vertically moving means, a fluid pressure cylinder capable of being moved up and down to a changeable fixed position is used.

In this case, the vertical movement of the first vertically moving means is controlled whereby the fixed position of the upper clamp portion can be automatically changed according to the change of the size of the lower metal mold.

The second vertically moving means has a first position for making the lower clamp portion parallel with the bead ring, a second position for making it position above the bead ring, and a third position which moves down in order to receive the bladder in the well, the lower clamp portion being designed to hold and clamp the lower end of the bladder between the inner lower ring and the outer lower clamp ring, preferably, being provided with a third vertically moving means for vertically moving the lower clamp ring.

In this case, the lower clamp portion is moved from the first position to the second position by the second vertically moving means, after which the lower clamp ring is moved down by the third vertically moving means, whereby the clamp of the lower end of the bladder can be released. Since the lower clamp ring is moved up and down with respect to the lower ring by the third vertically moving means, operating properties in exchange of the lower portion of the bladder at the lower clamp portion are excellent.

DESCRIPTION OF THE PREFERRED EMBODIMENTS

A center mechanism of a tire press according to an embodiment of the present invention will be described hereinafter with reference to the drawings.

Figure 1:
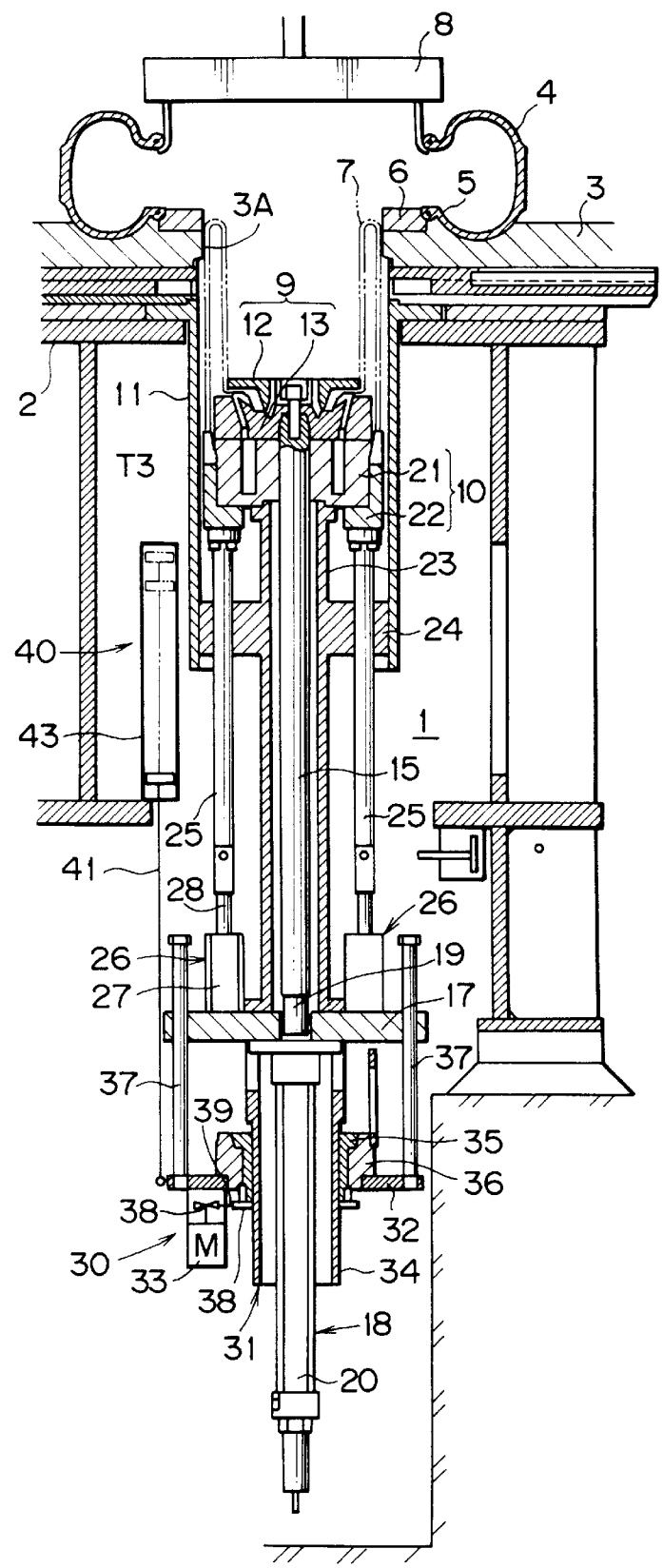
FIG. 1 is a sectional view showing the constitution of a center mechanism of a tire press.
Figure 2:
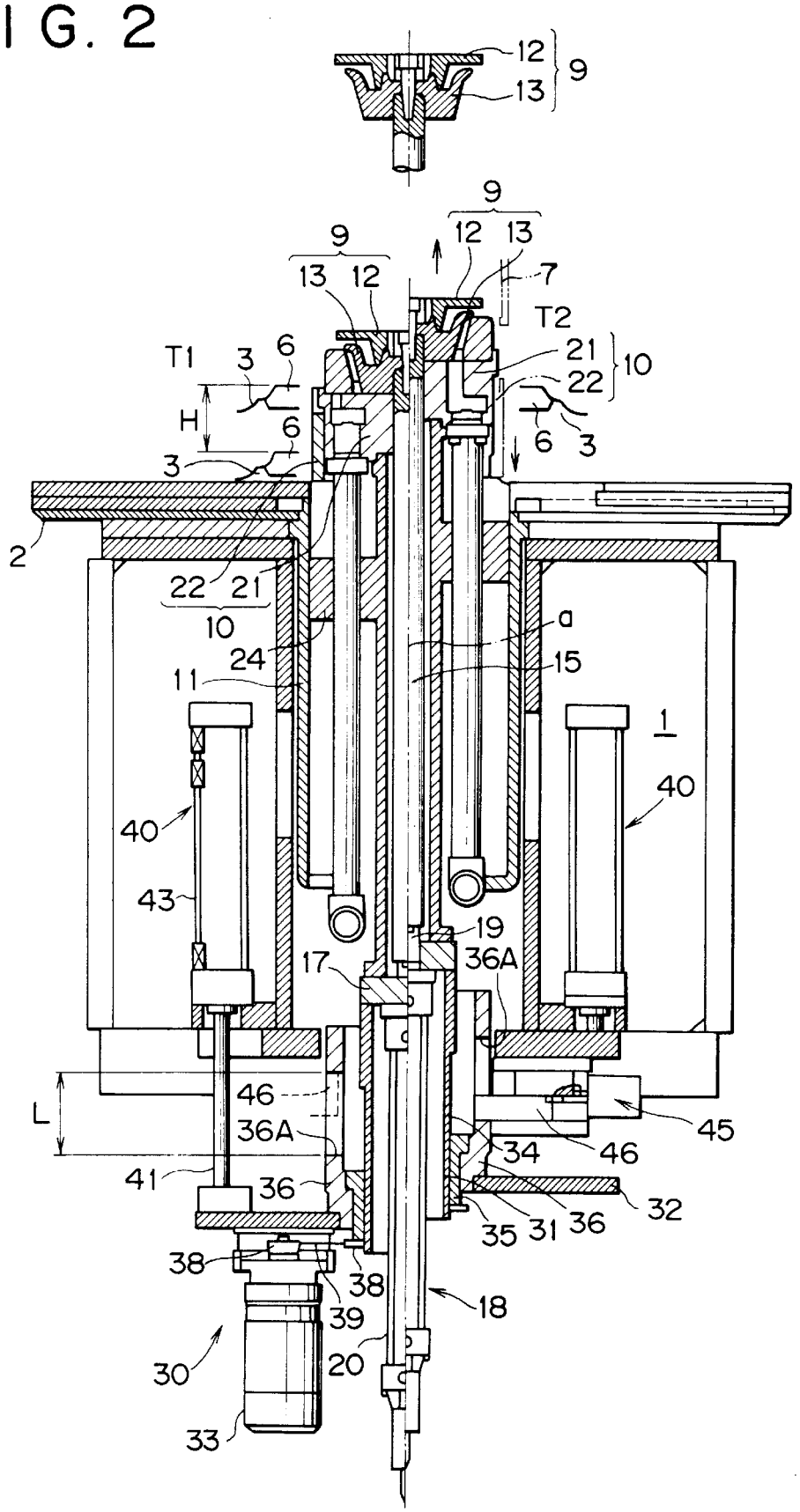
FIG. 2 is a sectional view for explaining the operation of mold exchange and bladder exchange in the center mechanism of the tire press.
Figure 3:
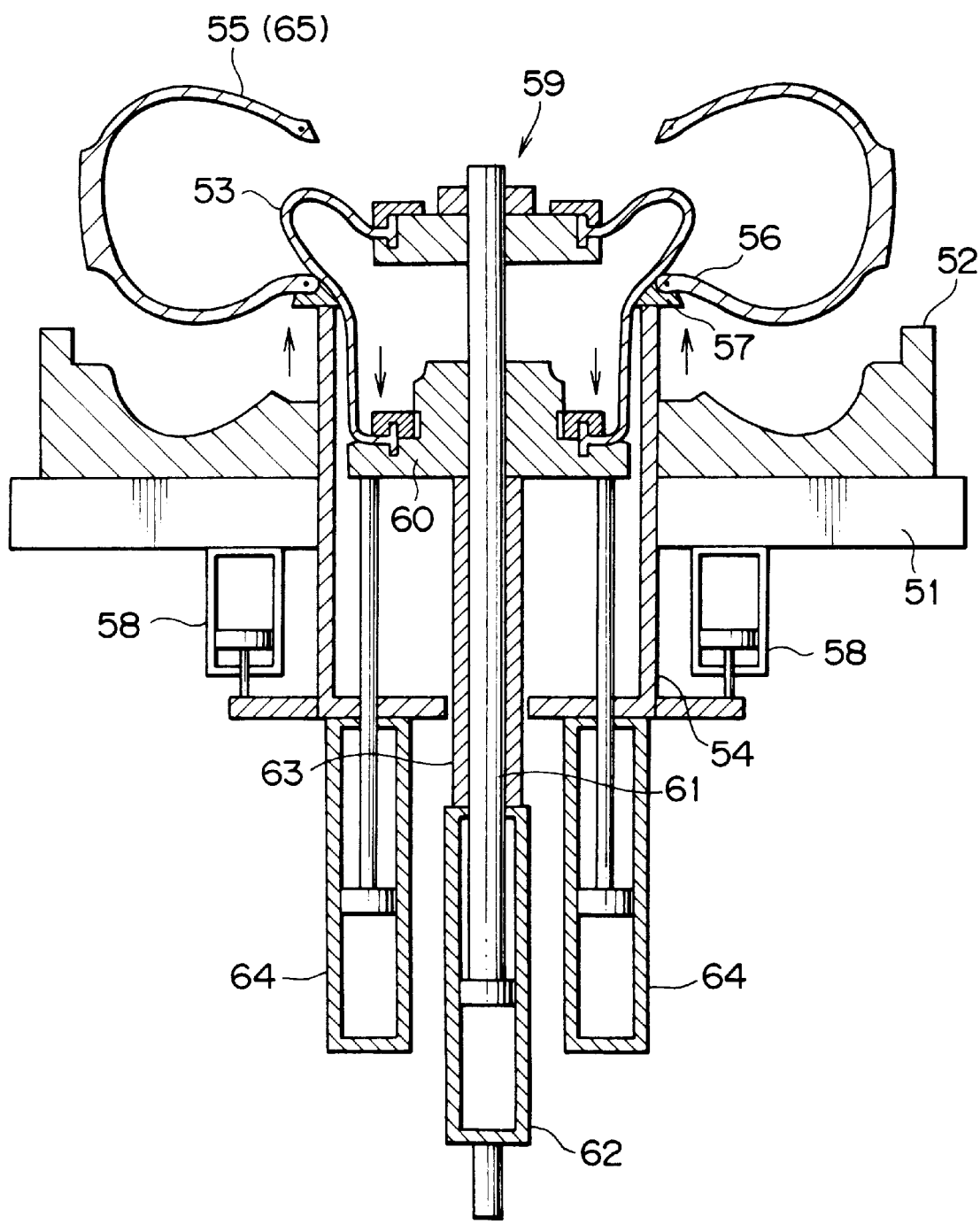
FIG. 3 is a sectional view showing the constitution of a conventional center mechanism of a tire press.

A center mechanism 1 of a tire press shown in FIGS. 1 and 2 is arranged downward of the center of a lower mold 3 (a lower metal mold), and comprises a lower bead ring 6 for supporting a lower bead 5 of a tire 4 (such as a green tire), and a bag-like bladder 7 having a flexibility (made of rubber) applying a shaping or the like to the green tire 4.

The lower bead ring 6 is secured to the lower mold 3, and supports a lower bead 5 of the green tire 4 inserted between an upper mold (not shown) and the lower mold 3 by a delivery loader 8. The lower mold 3 is exchangeably provided on the base frame 2 of the tire press through a heat insulating plate and a heating plate, and the upper mold (an upper metal mold) is closeable with respect to the lower mold 3.

A bladder 7 for applying shaping and vulcanizing to the green tire 4 is received into a well 11 connected to a center hole 3A of the lower mold 3 (a base frame 2), upper and lower ends thereof being clamped by clamp portions 9 and 10, respectively, within the well 11. The upper clamp portion 9 is constructed such that the upper end of the bladder 7 is held between the outer upper ring 12 and the inner upper clamp ring 13, and the rings 12 and 13 are bolted, and supported by a center post 15 extending on the center line a of the lower mold 3. This post 15 is connected to the upper clamp portion 9 by means of a bolt, slidably extending through the lower clamp portion 10 and extending to a support member 17 (a support plate) below the well 11. The lower end of the post 15 is connected to a first vertically moving means 18 provided on the support member 17. As the first vertically moving means 18, there is used a fluid pressure cylinder, for example, such as a hydraulic cylinder, which is provided with a sensor or the like capable of controlling detection and change of an expansion and contraction amount of a rod 19 (a piston) of the cylinder, a cylinder body 20 is mounted on the lower side of the support member 17, and the rod 19 is made to extend through the support member 17 and connected to the lower end of the center post 15.

The upper clamp portion 9 is moved up and down to a fixed position with respect to the lower clamp portion 10, by controlling expansion and contraction of the rod 19 by the first vertically moving means 18, to place the bladder 7 in an extended state, or in a stepwisely shrunk state (a shaping or vulcanizing state/contracted state).

The lower clamp portion 10 is constructed such that the lower end of the bladder 7 is held between the inner lower ring 21 and the outer lower clamp ring 22 and clamped, and the lower ring 21 is fitted into the lower clamp ring 22 and supported. The lower ring 21 is concentric with the center line a and is supported by a hollow member 23 positioned in the outer periphery of the center post 15. The hollow member 23 extends downward of the well 11 extending through the lower clamp ring 22, and is mounted on the support member 17. A collar-like guide 24 slidably moved in the inner periphery of the well 11 is formed integral with the hollow member 23. The lower clamp ring 22 is supported by a plurality of support shafts 25 positioned in the outer periphery of the hollow member 23, each support shaft 25 extends to the vicinity of the support member 17 extending through the collar-like guide 24. Each third vertically moving means 26 provided on the support member 17 is connected to each support shaft 25. As the third vertically moving means 26, there is used, for example, a fluid pressure cylinder (a hydraulic cylinder), a cylinder body 27 is mounted on the support member 17, and a rod 28 is connected to the lower end of the support shaft 25.

The lower clamp portion 10 is designed so that the rod 28 of each third vertically moving means 26 is expanded and contracted whereby the lower clamp ring 22 is moved up and down with respect to the lower ring 21 to enable removal or mounting of the bladder 7 (exchange of the bladder 7) (see the right-half of FIG. 2).

The center mechanism 1 is further provided with a fourth vertically moving means 30 for integrally vertically moving the bladder 7 and clamp portions 9, 10.

The fourth vertically moving means 30 comprises a driving motor 33 (such as a stepping motor) in addition to a cylindrical member 31 positioned in the outer periphery of the cylinder body 20 concentric with the center line a and an elevating member 32 (a lift beam) positioned below the support member 17. The cylindrical member 31 is mounted on the lower side of the support member 17, and extends through the coaxial elevating member 32 extending downward the support member 17. The cylindrical member 31 is formed with an external thread 34 from the lower end toward the support member 17, and a nut member 35 with an internal thread is engaged with the external thread 34. The elevating member 32 is provided with a cylindrical support member 36 for rotatably holding the nut member 35, and a plurality of guide shafts 37 extending through the support member 17. The cylindrical support member 36 is formed with a stopper slot 36A having a fixed length L which opens in a direction of the center line a as shown in FIG. 2. The driving motor 33 is mounted on the lower side of the elevating member 32 and is connected to the lower side of the nut member 35 by a pair of sprockets 38 and a chain 39. The driving motor 33 is connected to a control device (not shown) for controlling the whole system, the driving of which is controlled.

The nut member 35 is rotated by the driving of the driving motor 33 whereby the bladder 7, the clamp portions 9, 10 and the support member 17 are integrally moved up and down. The driving of the driving motor 33 is controlled to control the amount of the vertical movement of the bladder 7 and the clamp portions 9, 10.

The center mechanism 1 further comprises a plurality of second vertically moving means 40 for integrally vertically moving the bladder 7, the clamp portions 9, 10 and the fourth vertically moving means 30, etc., and a stopper means 45 for controlling the vertical movement caused by the second vertically moving means 40.

The second vertically moving means 40 comprises, for example, a fluid pressure cylinder, which is provided with a sensor capable of detecting and controlling the amount of expansion and contraction of a rod 41 (a piston) of the cylinder, a cylinder body 43 is mounted on the base frame 2 externally of the well 11, the rod 41 being connected to the elevating member 32.

The rod 41 of the second vertically moving means 40 is expanded and contracted whereby the bladder 7, the clamp portions 9, 10 and the fourth vertically moving means 30 are integrally moved up and down.

The stopper means 45 comprises a fluid pressure cylinder provided on the base frame 2 externally of the cylindrical support member 36 as shown in FIG. 2, which is provided with a stopper member 46 moved forward and backward with respect to the stopper slot 36A of the cylindrical support member 36.

The stopper means 45 causes the stopper member 46 to come in contact with the upper and lower ends of the stopper slot 36A of the cylindrical support member 36 moved up and down by the second vertically moving means 40 to control the vertical movement caused by the second vertically moving means 40.

The second vertically moving means 40 is constructed to have a first position T1 (see the left-half of FIG. 2) in which the lower clamp portion 10 is juxtaposed with the lower bead ring 6 by the stopper means 45, a second position T2 (see the right-half of FIG. 2) in which the lower clamp portion 10 is positioned above the lower bead ring 6 (the first position T1) by length L of the stopper slot 36A, and a third position T3 (see FIG. 1) moved down to receive the bladder 7 into the well 11.

The operation of the exchange of the lower mold and the exchange of the bladder by the center mechanism 1 of the tire press will be explained hereinafter.

The exchange of the lower mold 3 is carried out with the change of the size of the tire vulcanized by the tire press. The lower mold 3 before and after the exchange need to assume the first position in which the lower clamp portion 10 is juxtaposed with the lower bead ring 6 (see the left-half of FIG. 2) since the height thereof is differentiated.

The driving motor 33 (the fourth vertically moving means 30) is driven to rotate the nut member 35 (the internal thread) whereby the cylindrical member 31 engaged with the nut member 35 is moved up and down. At that time, the driving of the driving motor 30 is controlled by the control device whereby the lower clamp portion 10 is moved up and down by a height difference H of the lower mold 3 before and after the exchange to set the lower clamp portion 10 to the first position T1 juxtaposed with the lower bead ring 6 of the lower mold 3. Then, the stopper member 46 of the stopper mans 45 is placed in contact with the upper end of the stopper slot 36A of the cylindrical support member 36 to thereby control the downward movement of the bladder 7, the clamp portions 9, 10 and so on (see the left-hand of FIG. 2).

For applying shaping and vulcanizing to the green tire 4 after the exchange of the mold 3, the rod 19 of the first vertically moving means 18 is extended to place the bladder 7 in an extended state. At that time, merely by changing and controlling the extended amount of the rod 19 of the first vertically moving means 18, the bladder can be placed in an extended state with the upper clamp portion 9 put in a fixed position automatically according to various lower mold 3 to be exchanged and the tire size. Then, the green tire 4 is inserted between the upper mold and the lower mold 3 by the delivery loader 8 to support the lower bead 5 of the tire 4 on the lower bead ring 6 (see FIG. 1). In this state, fluid pressure (such a nitrogen gas) is introduced into the bladder 7 while contracting the rod 19 of the first vertically moving means 18 stepwisely, whereby shaping for placing the bladder 7 in close contact with the inner peripheral surface of the green tire 4 is carried out, and both the molds are closed and clamped, after which vulcanizing is applied thereto.

At that time, the lower clamp portion 10 is forced down by the fluid pressure introduced into the bladder 7, but since the force is received by the stopper member 46, a positional relationship between the lower clamp portion 10 and the lower bead ring 6 remains unchanged.

Upon completion of the vulcanization of the green tire 4, the upper mold is opened to the lower mold 3, the upper clamp portion 9 is again moved up to place the bladder 7 in an extended state, and the tire vulcanized by the delivery loader is torn off from the lower mold 3, which is delivered to the succeeding step outside the tire press.

In the exchange of the bladder 7, the rod 41 of the second vertically moving means 40 is contracted whereby the lower clamp portion 10 is moved up above the lower bead ring 6, thus setting it to the second position T2. At that time, as the bladder 7, and the clamp portions 9, 10 move up, the stopper member 46 of the stopper means 45 comes in contact with the lower end of the stopper slot 36A to make the upward movement of the second vertically moving means 40 the fixed amount (the length L of the stopper slot 36A).

Then, the rod of the first vertically moving means 18 is extended to place the bladder 7 in an extended state, and the rod 28 of the third vertically moving means 26 is contracted to move down the lower clamp ring 22 with respect to the lower ring 21 whereby the clamping of the lower end of the bladder 7 is released (see the right-half of FIG. 2). Then, the old bladder 7 is removed, and the lower end of a new bladder 7 is fitted into the lower ring 21. At this time, the bladder 7 is in an extended state and stabilized.

Subsequently, when the rod of the third vertically moving means 26 is extended, the lower clamp ring 22 is moved up, and the lower end of the bladder 7 is pressed and clamped between the lower ring 21 and the lower clamp ring 22. When the bladder 7 is exchanged, the position of the lower ring 21 remains unchanged, and therefore, the bladder 7 can be firmly fitted into the lower ring 21 and set in the stable extended state. Therefore, there is less possibility of failing to exchange the bladder 7, and the operating properties in the exchange of the bladder 7 are excellent. Then, the rod 41 of the second vertically moving means 40 is extended whereby the lower clamp portion 10 is returned from the second position T2 to the first position T1, and shaping with respect to the green tire 4 is carried out, then shifting to the vulcanizing.

Alternatively, the expansion and contraction amount of the rod 41 of the second vertically moving means 40 is detected and controlled by a sensor so that the second vertically moving means 40 may have the first position T1 and the second position T2.

While the invention has been described in detail and with reference to specific embodiments thereof, it will be apparent to one skilled in the art that various changes and modifications can be made therein without departing from the spirit and the scope thereof.

I claim:

1. A center mechanism of a tire press, comprising:
   a well for receiving a bladder therein, said bladder being arranged to be freely inserted into the inner surface of a green tire inserted into closable upper and lower metal molds, an upper clamp portion and a lower clamp portion of the bladder being separately moved up and down;
   a lower bead ring secured to said lower metal mold to support a lower bead of said green tire;
   a center post for supporting said upper clamp portion;
   a hollow member for supporting said lower clamp portion and extending around said center post;

a support member provided below said hollow member;

first vertically moving means connected to the lower end of said center post and mounted on said support member;

a tubular member downward of said support member, positioned around said first vertically moving means, being provided with an external thread portion;

an elevating member coaxial with said tubular member and rotatably holding an internal thread portion engaged with said external thread portion and rotatably driven; and a second vertically moving means connected to said elevating member and mounted on a frame for supporting said lower metal mold.

2. The center mechanism according to claim 1, further comprising:

a disengageable stopper member provided between said elevating member and said frame to stop downward movement of said lower clamp portion.

3. The center mechanism according to claim 1, wherein said first vertically moving means comprises a fluid pressure cylinder capable of being stopped.

4. The center mechanism according to claim 1, wherein said second vertically moving means has a first position for juxtaposing said lower clamp portion with said bead ring, a second position for positioning said lower clamp portion above said bead ring, and a third position moved down to receive said bladder into said well; and said lower clamp portion is constructed such that the lower end of said bladder is held and clamped between an inner lower ring and an outer lower clamp ring, and a including third vertically moving means for vertically moving said lower clamp ring.

5. A center mechanism of a tire press in which an upper clamp portion and a lower clamp portion of a bladder freely inserted into the inner surface of a green tire inserted into closable upper and lower metal molds are separately moved up and down, comprising a well for receiving a bladder, a lower bead ring for supporting a lower bead of said green tire being secured to said lower metal mold, said center mechanism comprising:

a center post for supporting said upper clamp portion;

a hollow member for supporting said lower clamp portion and extending around said center post;

a support member provided below said hollow member;

first vertically moving means connected to the lower end of said center post and mounted on said support member;

a tubular member downward of said support member, positioned around said first vertically moving means, being provided with an external thread portion;

an elevating member coaxial with said tubular member and rotatably holding a internal thread portion engaged with said external thread portion and rotatably driven; and a second vertically moving means connected to said elevating member and mounted on a frame for supporting said lower metal mold.

6. A tire press having the center mechanism according to claim 1.

7. A tire press having the center mechanism according to claim 2.

8. A tire press having the center mechanism according to claim 3.

9. A tire press having the center mechanism according to claim 4.

10. A tire press having the center mechanism according to claim 5.

* * * * *